US007171895B2

(12) United States Patent
Oshima et al.

(10) Patent No.: US 7,171,895 B2
(45) Date of Patent: Feb. 6, 2007

(54) STENCIL MATERIAL ROLL

(75) Inventors: Kenji Oshima, Ibaraki-ken (JP); Morio Ohashi, Ibaraki-ken (JP); Hitoshi Watanabe, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 143 days.

(21) Appl. No.: 10/784,791

(22) Filed: Feb. 24, 2004

(65) Prior Publication Data

US 2004/0166271 A1 Aug. 26, 2004

(30) Foreign Application Priority Data

Feb. 26, 2003 (JP) ............................ 2003-048850

(51) Int. Cl.
*B32B 3/26* (2006.01)

(52) U.S. Cl. ....................... 101/116; 428/36.9; 428/43; 242/160.4; 242/613; 242/912

(58) Field of Classification Search ............... 428/36.9, 428/43; 101/116; 242/613, 160.4, 912; 400/242
See application file for complete search history.

(56) References Cited

U.S. PATENT DOCUMENTS 5,366,085 A * 11/1994 Kewin ........................ 206/407
5,455,617 A 10/1995 Stephenson et al. ........ 347/214
6,334,587 B1 1/2002 Röder ........................ 242/563
6,530,519 B1 3/2003 Suzuki

FOREIGN PATENT DOCUMENTS

| | | | |
|---|---|---|---|
| EP | 0 979 736 | A1 | 2/2000 |
| EP | 01 066 967 | A2 | 1/2001 |
| JP | 7(1995)-2525 | | 1/1995 |
| JP | 7-2525 | Y2 | 1/1995 |
| JP | 2000-281268 | A | 10/2000 |
| JP | 2003-16415 | | 1/2003 |

* cited by examiner

*Primary Examiner*—Alexander S. Thomas
(74) *Attorney, Agent, or Firm*—Frommer, Lawrence & Haug LLP; Matthew K. Ryan

(57) ABSTRACT

A stencil material roll includes stencil material in a continuous length rolled around a core tube and a memory IC which stores predetermined information. The memory IC is mounted on a wall portion which forms a part of the core tube or on a wall portion fixed to the core tube, and an easy-to-cut portion is provided on the wall portion to surround the portion where the memory IC is mounted.

20 Claims, 8 Drawing Sheets

STENCIL MATERIAL ROLL

BACKGROUND OF THE INVENTION

1. Field of the Invention

This invention relates to a stencil material roll and more particularly to a stencil material roll which comprises stencil material in a continuous length rolled around a core tube and is provided with a storage means storing predetermined information.

2. Description of the Related Art

There have been known various stencil printers in which a part of stencil material in a continuous length is imagewise perforated by driving a thermal head or the like on the basis of image data obtained by reading an original by, for instance, an image scanner, the imagewise perforated part of the stencil material is subsequently severed from the stencil material to form a stencil, the stencil is wound around a printing drum and printing is made by supplying ink inside the printing drum and transferring ink to printing papers by a roller and the like through the stencil.

In the stencil printer, stencil material rolls are used for the reason of improvement in the workability and easiness of handling. In U.S. Pat. No. 6,530,519, there has been proposed a stencil material roll in which a storage means such as a memory IC is provided and parameters such as data on the remainder of the stencil material roll, data on the kind of the stencil material roll and the like are stored in the storage means. The parameters such as remainder data (data on the remainder of the stencil material roll), kind data (data on the kind of the stencil material roll) and the like stored in the storage means are read out by a stencil printer and used for controlling various actions in the stencil printer.

As a method of reading various kinds of information from the memory IC (storage means) of the stencil material roll, there has been proposed a method in which a memory IC with an antenna is provided on a stencil material roll and the information stored in the memory IC is read through the antenna in a non-contact system. Further, there has been proposed in Japanese Unexamined Patent Publication No. 2000-281268 a method of installing a memory IC with an antenna in which the memory IC is disposed in the core tube around which the stencil material is wound. Further, in Japanese Utility Model Publication No. 7(1995)-2525, there has been proposed a method of installing a memory IC with an antenna in which the memory IC is disposed inside the core tube to be substantially in perpendicular to the direction of the longitudinal axis of the core tube so that the information can be stably read even if the stencil material roll is revolved. By reading out the information stored in the memory IC by providing a readout antenna to be opposed to the memory IC disposed in the manner described above, the information can be read out at a higher sensitivity.

It is necessary to separate the core tube and the memory IC from each other to discard them or to recycle them after use of the stencil material roll. However, when the memory IC is disposed in the core tube as disclosed in Japanese Unexamined Patent Publication No.2000-281268, it is difficult to separate the core tube and the memory IC from each other. It is also difficult to separate the core tube and the memory IC from each other depending on the position of the memory IC when the memory IC is disposed inside the core tube as disclosed in Japanese Utility Model Publication No. 7(1995)-2525.

Further, though, in Japanese Utility Model Publication No. 7(1995)-2525, there is proposed a method in which the memory IC is disposed inside the core tube to be substantially in perpendicular to the direction of the longitudinal axis of the core tube so that the antenna sensitivity is improved and the information can be stably read even if the stencil material roll is revolved, it is not easy to dispose the memory IC inside the core tube to be substantially in perpendicular to the direction of the longitudinal axis of the core tube and at the same time, the direction of the memory IC can be changed during use of the stencil material roll. Further, it is preferred that the reader means for reading out the information from the memory IC be disposed at a distance as small as possible from the memory IC and at the same time can read out the information constantly at the same distance. For this purpose, it is necessary for the readout antenna to be in a parallel position relatively to the memory IC.

Since the memory IC is an electronic component and is apt to be broken on impact, it is preferred that the memory IC be not exposed to impact.

SUMMARY OF THE INVENTION

In view of the foregoing observations and description, the primary object of the present invention is to provide a stencil material roll with a storage means such as a memory IC in which the storage means can be easily separated from a core tube.

Another object of the present invention is to provide a stencil material roll in which a storage means can be easily disposed inside the core tube to be substantially in perpendicular to the direction of the longitudinal axis of the core tube, to be held in a parallel position relatively to a readout means and to be held substantially at a constant distance from a readout means.

Still another object of the present invention is to provide a stencil material roll which can prevent the storage means from being broken on exterior impact.

In accordance with a first aspect of the present invention, there is provided a stencil material roll comprising stencil material in a continuous length rolled around a core tube and a storage means which stores predetermined information, wherein the improvement comprises that the storage means is mounted on a wall portion which forms a part of the core tube or on a wall portion fixed to the core tube, and an easy-to-cut portion is provided on the wall portion to surround the portion where the storage means is mounted.

"The wall portion fixed to the core tube" may be a wall portion which forms a part of a member fixed to the core tube in abutment against an end face of the core tube.

The "easy-to-cut portion" is a portion which is weaker than the other portion. For example, the easy-to-cut portion may be formed by forming perforations through the wall portion to surround the portion where the storage means is mounted or by forming a thin wall portion to surround the portion where the storage means is mounted.

The wall portion on which the storage means is mounted may be a wall portion which is provided inside the core tube to extend in a direction substantially perpendicular to the longitudinal axis of the core tube.

The cut resistance D of the wall portion on which the storage means is mounted may be in the range of larger than 8N and smaller than 185N.

"The cut resistance D" is force required to remove the storage means by cutting the wall portion along the easy-to-cut portion. It is preferred that the cut resistance D be such that the portion on which the storage means is mounted does not drop during use or transport of the stencil material roll and can be removed from the stencil material roll by simply pushing the portion by a finger. The range described above, $8N<D<185N$, is a range defined from the above viewpoint. The method of measuring the cut resistance D will be described later.

In accordance with a second aspect of the present invention, there is provided a stencil material roll comprising stencil material in a continuous length rolled around a core tube and a storage means which stores predetermined information, wherein the improvement comprises that the storage means is mounted on the core tube by way of a storage means mounting member which is removably mounted on the core tube.

The storage means mounting member may be provided with a wall portion which is provided inside the core tube to extend in a direction substantially perpendicular to the longitudinal axis of the core tube.

The storage means mounting member may be provided with an abutment portion abutting against an end face of the core tube.

A rib which is brought into contact with the inner surface of the core tube under pressure may be formed on a surface of a junction joining the abutment portion and the wall portion opposed to the inner surface of the core tube.

The draw resistance H of the storage means mounting member may be in the range of larger than 3N and smaller than 250N.

"The draw resistance H" is force required to remove the storage means mounting member from the core tube. It is preferred that the draw resistance H be such that the storage means mounting member cannot be easily removed from the core tube and can be removed therefrom by a finger. The range described above, $3N<H<250N$, is a range defined from the above viewpoint. The method of measuring the draw resistance H will be described later.

In the stencil material rolls in accordance with the first and second aspects of the present invention, a protective plate for protecting the storage means may be disposed on the end portion of the core tube on the axially outside of the storage means.

In this case, the protective plate need not be in contact with the end face of the core tube but may be disposed on the end portion of the core tube by way of another member on the end face of the core tube.

The storage means may be mounted on an axially inner surface of the wall portion.

In the stencil material roll in accordance with the first aspect of the present invention, since the storage means is mounted on a wall portion which forms a part of the core tube or on a wall portion fixed to the core tube, and an easy-to-cut portion is provided on the wall portion to surround the portion where the storage means is mounted, the storage means and the core tube are easily separated.

When the storage means is mounted on a wall portion which forms a part of a member fixed to the core tube in abutment against an end face of the core tube, the distance of the storage means from the end face of the core tube can be set to a desired distance, for instance, by controlling the length of the junction joining the portion of the member which is brought into abutment against the core tube and said wall portion and accordingly, the distance between the storage means and the readout means can be kept at a desired constant distance by disposing the readout means such as an antenna on the end face of the core tube, whereby the information stored by the storage means can be stably read.

When the wall portion on which the storage means is mounted is a wall portion which is provided inside the core tube to extend in a direction substantially perpendicular to the longitudinal axis of the core tube, the information stored by the storage means can be stably read at a high sensitivity even if the stencil material roll is revolved, by disposing the readout means such as an antenna to be opposed to the wall portion.

When the easy-to-cut portion is formed by forming perforations through the wall portion to surround the portion where the storage means is mounted, formation of the easy-to-cut portion is facilitated and the cut resistance can be easily controlled by changing the number and/or size of the perforations.

When the easy-to-cut portion is formed by forming a thin wall portion to surround the portion where the storage means is mounted, formation of the easy-to-cut portion is facilitated and the cut resistance can be easily controlled by changing the thickness of the thin wall portion.

When the cut resistance D of the wall portion on which the storage means is mounted is in the range of larger than 8N and smaller than 185N, the storage means can be relatively easily removed from the core tube after use of the stencil material roll while the storage means can be prevented from dropping off the core tube prior to or during use of the stencil material roll.

In the stencil material roll in accordance with the second aspect of the present invention, since the storage means is mounted on the core tube by way of a storage means mounting member which is removably mounted on the core tube, the storage means and the core tube can be easily separated by demounting the storage means mounting member from the core tube.

When the storage means mounting member is provided with a wall portion which is provided inside the core tube to extend in a direction substantially perpendicular to the longitudinal axis of the core tube, the information stored by the storage means can be stably read at a high sensitivity even if the stencil material roll is revolved, by disposing the readout means such as an antenna to be opposed to the wall portion.

When the storage means mounting member is provided with an abutment portion abutting against an end face of the core tube, the distance of the storage means from the end face of the core tube can be set to a desired distance, for instance, by controlling the length of the junction joining the abutment portion and said wall portion and accordingly, the distance between the storage means and the readout means can be kept at a desired constant distance by disposing the readout means such as an antenna on the end face of the core tube, whereby the information stored by the storage means can be stably read.

When a rib which is brought into contact with the inner surface of the core tube under pressure is formed on a surface of a junction joining the abutment portion and the wall portion opposed to the inner surface of the core tube, the draw resistance of the storage means mounting member can be increased by bringing the rib into contact with the inner surface of the core tube under pressure.

When the draw resistance H of the storage means mounting member is in the in the range of larger than 3N and smaller than 250N, the storage means can be relatively easily removed from the core tube together with the storage means mounting member after use of the stencil material roll while the storage means mounting member can be prevented from dropping off the core tube prior to use of the stencil material roll. Further, the storage means mounting member can be prevented from sliding relatively to the core tube and being rotated separately from the core tube during use of the stencil material roll.

When a protective plate for protecting the storage means is disposed on the end portion of the core tube on the axially outside of the storage means in the stencil material rolls in accordance with the first and second aspects of the present invention, the storage means can be prevented from contacting another member to be broken.

When the storage means is mounted on an axially inner surface of the wall portion in the stencil material rolls in accordance with the first and second aspects of the present invention, the storage means also can be prevented from contacting another member to be broken.

DESCRIPTION OF THE PREFERRED EMBODIMENTS

Figure 1:
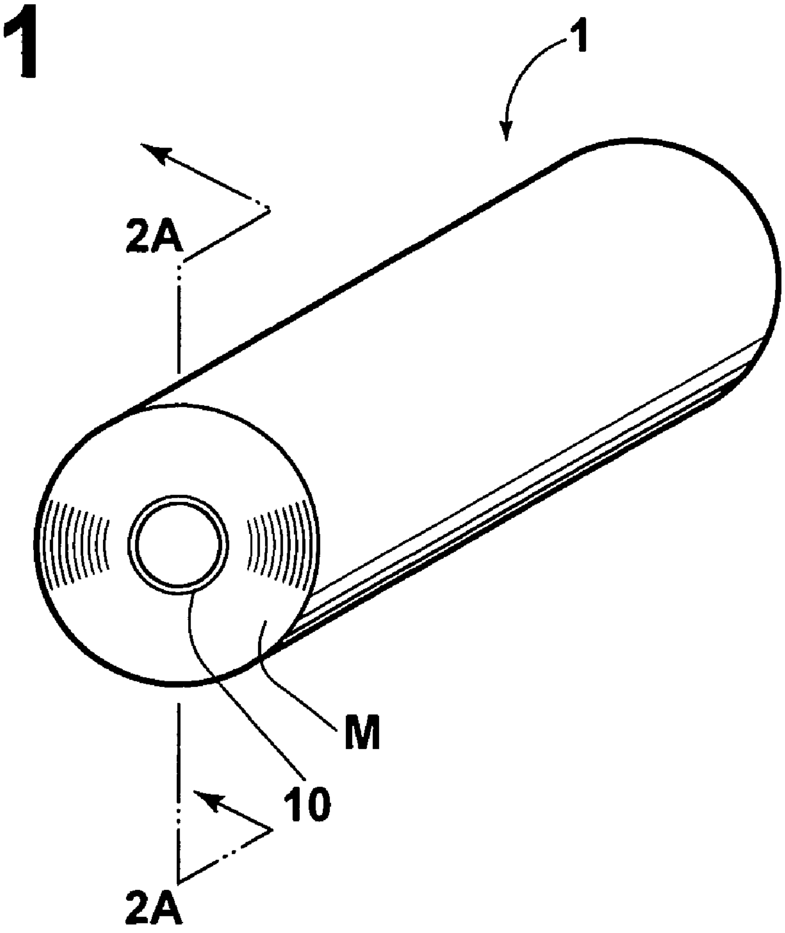
FIG. 1 is a perspective view of a stencil material roll in accordance with a first embodiment of the present invention.
Figure 2A:
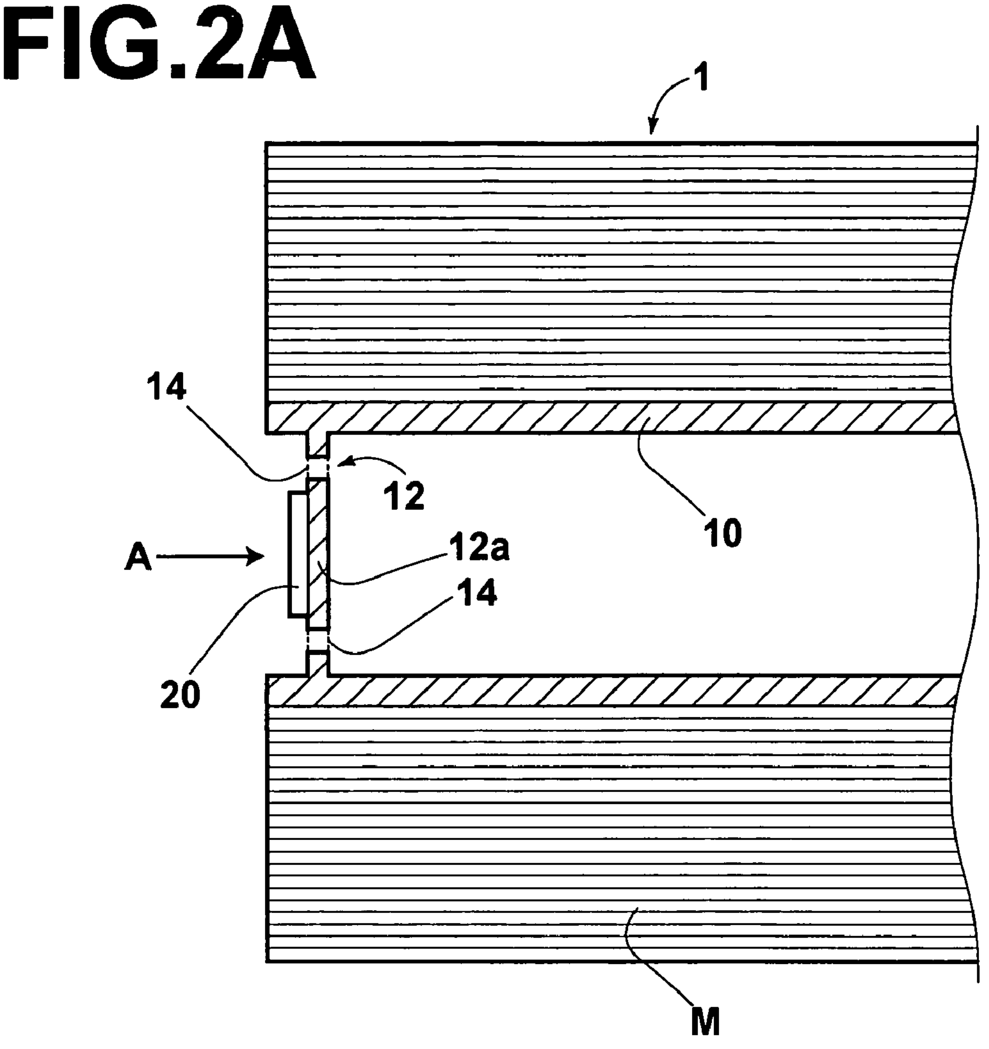
FIG. 2A is a cross-sectional view of the stencil material roll taken along line 2A—2A in FIG. 1.

In FIG. 1, a stencil material roll 1 in accordance with a first embodiment of the present invention comprises a stencil material M in a continuous length rolled around a cylindrical core tube 10 and provided with a storage means 20 inside the core tube 10 as shown in FIG. 2A. Further, as shown in FIG. 2A, the storage means 20 is mounted on a wall portion 12 erected inside the core tube 10 substantially in perpendicular to the longitudinal axis of the core tube 10. When a wall portion 12 is provided in this manner, the information stored by the storage means 20 can be stably read at a high sensitivity even if the stencil material roll 1 is revolved, by disposing the readout means such as an antenna to be opposed to the wall portion 12.

Figure 2B:
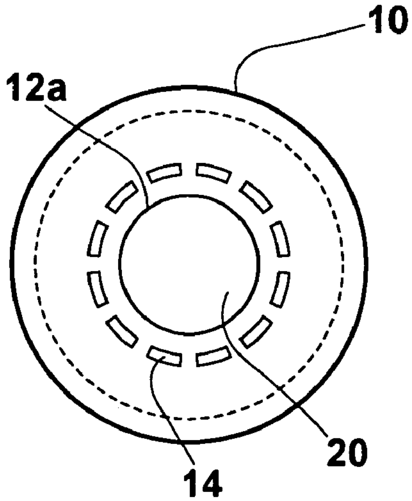
FIG. 2B is an end view of the stencil material roll as seen in the direction of arrow A in FIG. 2A, FIGS. 3A and 3B are views for illustrating a method of measuring the cut resistance of the wall portion on which the storage means is mounted.

As shown in FIGS. 2A and 2B, an easy-to-cut portion 14 in the form of perforations is formed in the wall portion 12 to surround a portion 12*a* where the storage means 20 is mounted. Though the easy-to-cut portion 14 is in the form of perforations in this particular embodiment, the easy-to-cut portion 14 need not be limited to the perforations so long as the portion 12*a* where the storage means 20 is mounted is weaker along the easy-to-cut portion 14 and is easy to cut along the same. For example, the easy-to-cut portion 14 may be a thin wall portion. When the easy-to-cut portion 14 is formed by forming perforations, formation of the easy-to-cut portion 14 is facilitated and the cut resistance of the portion 12*a* where the storage means 20 is mounted can be easily controlled by changing the number and/or size of the perforations.

The core tube 10 is generally formed of pulp or resin.

By pushing the storage means 20 by a finger, the easy-to-cut portion 14 is cut and the portion 12*a* on which the storage means 20 is mounted can be removed from the core tube 10, whereby the core tube 10 and the storage means 20 can be separated from each other and can be separately discarded or recovered.

Though, in the stencil material roll 1 of this embodiment, the storage means 20 can be removed from the core tube 10 after use of the stencil material roll 1, it is not preferred that the storage means 20 drops off the core tube 10 during use or transportation of the stencil material roll 1. Accordingly, the cut resistance D, that is, force (measured in newtons, "N") required to cut the portion 12*a* along the easy-to-cut portion 14, is preferably in the range of the following formula (1) and more preferably in the range of the following formula (2).

$$8N < D < 185N \qquad (1)$$

$$20N < D < 170N \qquad (2)$$

The cut resistance D is measured in the following manner.

Figure 3A:
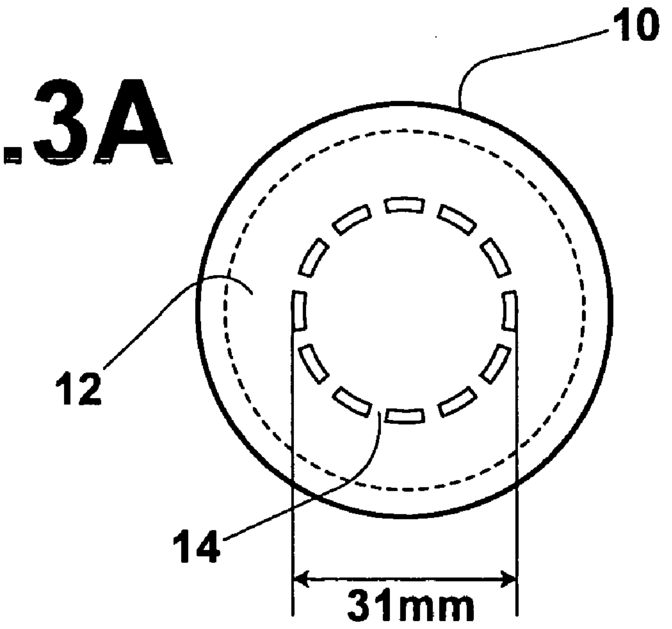
Figure 3B:
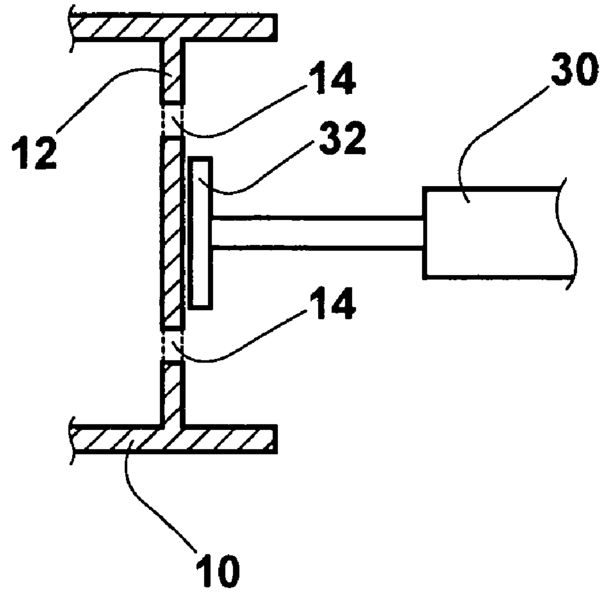

Assuming that the easy-to-cut portion 14 is in the form of perforations formed in the wall portion 12 arranged in a circle 31 mm in diameter as shown in FIG. 3A, a central portion of the circle is pushed by a head (shaped like a circle 15 mm in diameter) 32 of a push-pull gauge (9550A of AIKOH ENGINEERING CORP) 30 at a speed of 60 mm/min. The value measured by the push-pull gauge 30 (23° C., 50% RH) represents the cut resistance D.

The ranges of the above formulae (1) and (2) were obtained by first preparing a plurality of core tubes having different values of the cut resistance D and evaluating each core tube by pushing the center of the circle by a finger. The relation between the evaluation and the value of the cut resistance D is shown in the following table 1.

TABLE 1

| D(N) | evaluation |
|---|---|
| 5.0 | X |
| 8.0 | X |
| 11.0 | Δ |
| 20.0 | Δ |
| 25.2 | ○ |
| 62.0 | ○ |
| 96.0 | ○ |
| 115.0 | ○ |
| 136.0 | ○ |

TABLE 1-continued

| D(N) | evaluation |
|---|---|
| 170.0 | ▲ |
| 185.0 | X |

○; does not drop easily during use and can be easily pushed off after use.
Δ; sometimes slightly shifted during use but does not drop off. Practically no problem.
▲; difficult to push off but can be pulled off after use.
X; readily shifted during use or cannot be pushed off after use.

As can be seen from the above table 1, the cut resistance D is preferably in the range of formula (1) and more preferably in the range of formula (2). Conversely, when the cut resistance D is in the range of formula (1) or formula (2), the storage means 20 can be easily removed from the core tube 10 after use of the stencil material roll 1 and nevertheless cannot drop off the core tube 10 prior to or during use of the stencil material roll.

A stencil material roll in accordance with a second embodiment of the present invention will be described, hereinbelow.

Figure 4:
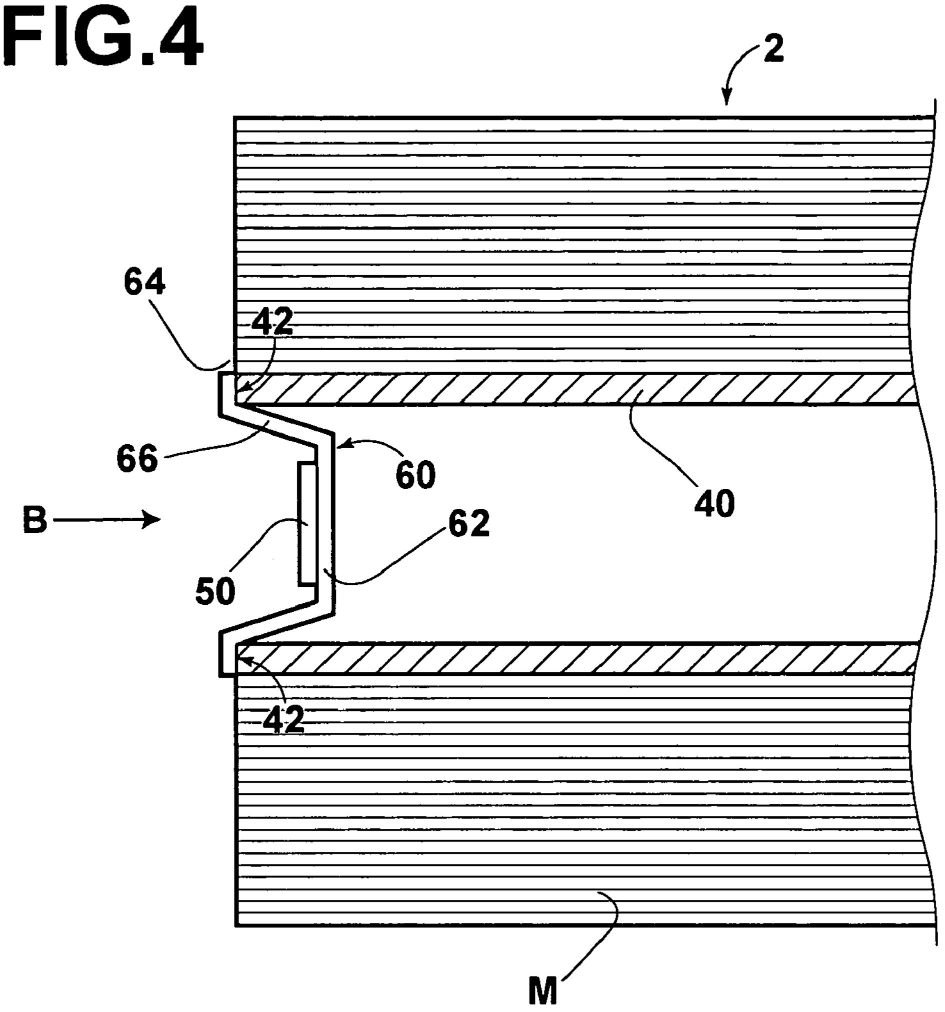
FIG. 4 is a fragmentary cross-sectional view of a stencil material roll in accordance with a second embodiment of the present invention.

As shown in FIG. 4, a stencil material roll 2 in accordance with a second embodiment of the present invention comprises, as the stencil material roll 1 of the first embodiment, a stencil material M in a continuous length rolled around a cylindrical core tube 40 and provided with a storage means 50 inside the core tube 40. In this embodiment, the storage means 50 is mounted on the core tube 40 by way of a storage means mounting member 60 which is removably mounted on the core tube 40.

Figure 5:
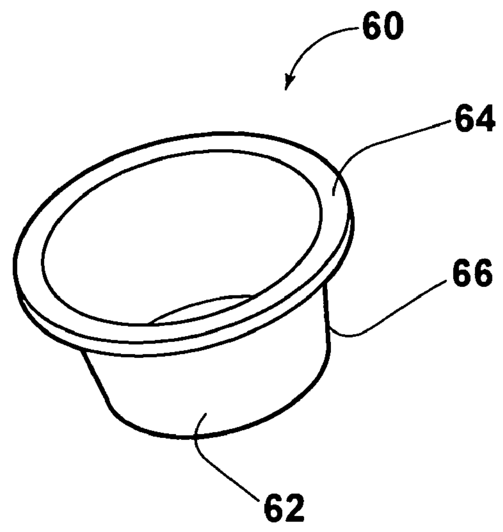
FIG. 5 is a perspective view showing the storage means mounting member employed in the stencil material roll shown in FIG. 4, FIGS. 6A and 6B are views for illustrating a method of measuring the draw resistance of the storage means mounting member.

As shown in FIG. 5, the storage means mounting member 60 is like a hat in shape and comprises a wall portion 62 which extends substantially in perpendicular to the longitudinal axis of the core tube 40 when the storage means mounting member 60 is mounted on the core tube 40, an abutment portion (an annular flange-like portion) 64 which is brought into abutment against an end face 42 of the core tube 40 and a junction 66 joining the wall portion 62 and the abutment portion 64. With the arrangement of the storage means mounting member 60, the distance between the wall portion 62 and the end face 42 of the core tube 40 can be determined and at the same time, the wall portion 62 can be disposed to extend substantially in perpendicular to the longitudinal axis of the core tube 40 by simply mounting the storage means mounting member 60 with the storage means 50 on the core tube 40. When the wall portion 62 extends substantially in perpendicular to the longitudinal axis of the core tube 40, the information stored by the storage means 50 can be stably read at a high sensitivity even if the stencil material roll is revolved, by disposing the readout means such as an antenna to be opposed to the wall portion 62.

The storage means mounting member 60 can be removed from the core tube 40, and the core tube 40 and the storage means 50 can be separated from each other to be separately discarded or recovered.

Though, in the stencil material roll 2 of this embodiment, the storage means mounting member 60 together with the storage means 50 can be removed from the core tube 40 after use of the stencil material roll 2, it is not preferred that the storage means 50 drops off the core tube 40 during transportation of the stencil material roll 2. Further, the stencil material roll 2 is laterally pressed in the direction of arrow B in FIG. 4 and held by a holding member when it is rotated. It is not preferred that the storage means mounting member 60 slides relatively to the core tube 40 and is rotated separately from the core tube 40 when the stencil material roll 2 is rotated. Accordingly, the draw resistance H, that is, force required to remove the storage means mounting member 60 from the core tube 40, is preferably in the range of the following formula (3) and more preferably in the range of the following formula (4).

$$3N<H<234N \quad (3)$$

$$10N<H<150N \quad (4)$$

The draw resistance H is measured in the following manner.

Figure 6A:
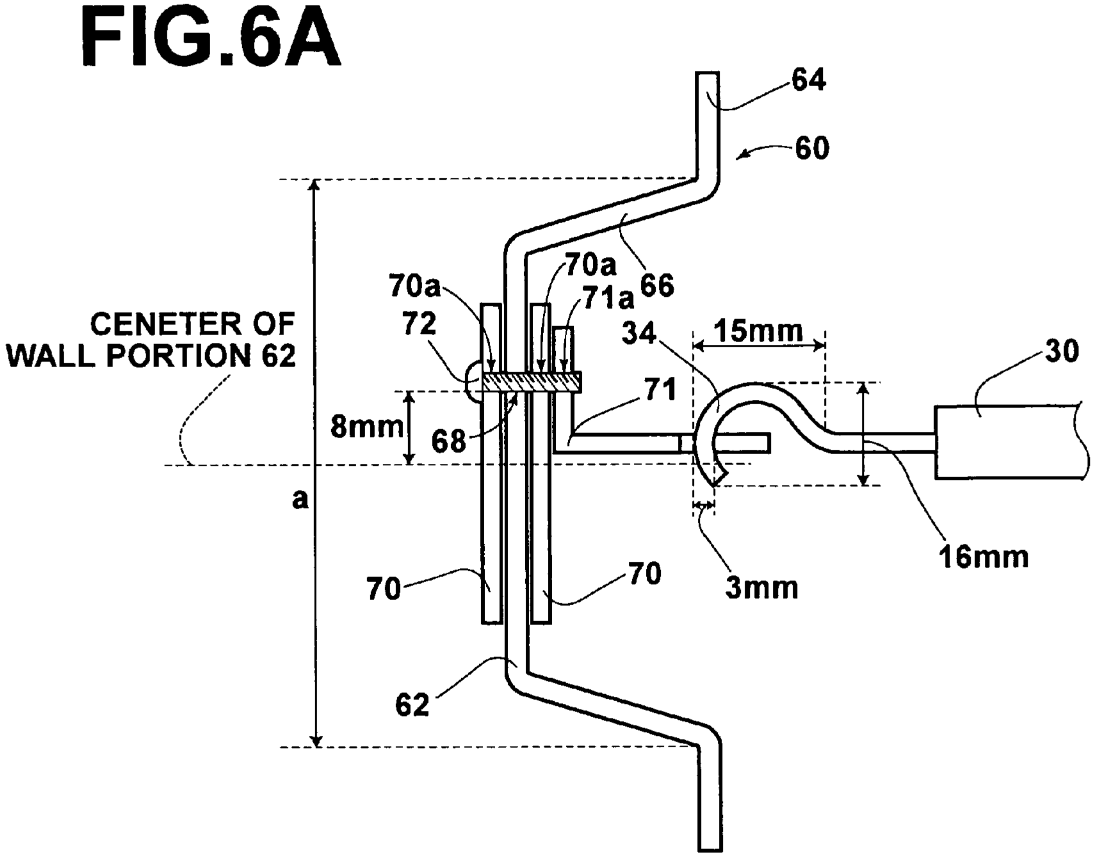
Figure 6B:
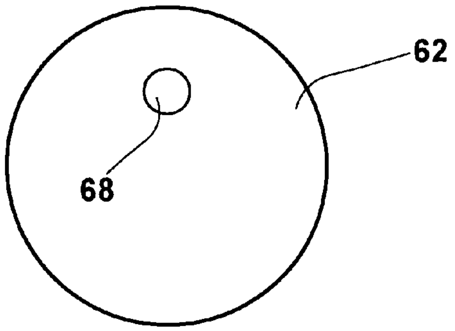
Figure 7A:
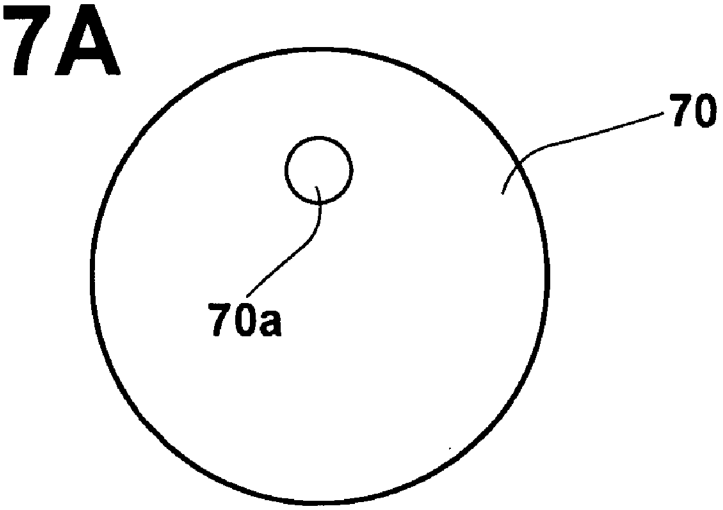
FIG. 7A is a plan view showing a plate used for measuring the draw resistance of the storage means mounting member.
Figure 7B:
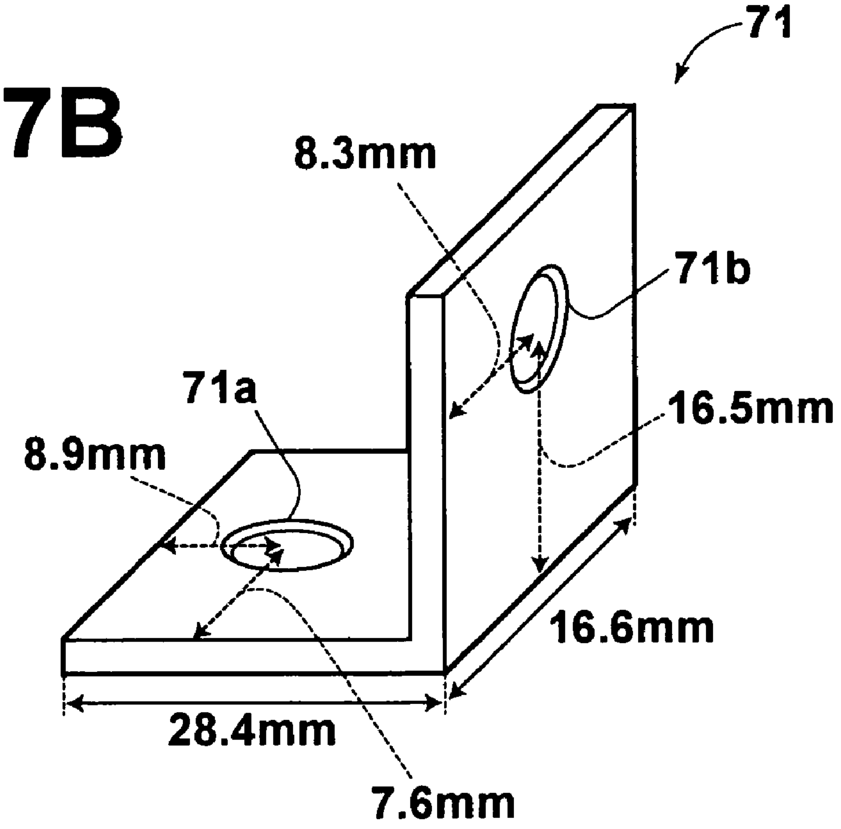
FIG. 7B is a perspective view showing an L-shaped plate used for measuring the draw resistance of the storage means mounting member.

A plurality of storage means mounting member 60 different from each other in diameter a (FIG. 6A) of the junction 66 are prepared. A 4 mm diameter opening 68 is formed in the wall portion 62 of each storage means mounting member 60 as shown in FIG. 6B. As shown in FIG. 6A, the opening 68 is at a distance of 8 mm from the center of the wall portion 62. The wall portion 62 of each storage means mounting member 60 is sandwiched between inner and outer circular metal plates 70 which are 1.5 mm and 41.8 mm in thickness and diameter and an L-shaped metal plate 71 which is 1.5 mm in thickness is set on the outer circular plate 70 as shown in FIG. 6A. As shown in FIG. 7A, each of the inner and outer circular metal plates 70 is provided with an opening 70*a* which is the same in diameter as the opening 68 in the wall portion 62 at the distance from the center thereof equal to the distance between the opening 68 and the center of the wall portion 62. As shown in FIG. 7B, the L-shaped metal plate 71 is provided with first and second openings 71*a* and 71*b* which are 4 mm in diameter.

The inner and outer circular metal plates 70 and the L-shaped metal plate 71 are set to the wall portion 62 with the openings 70*a* of the inner and outer circular metal plates 70 and the first opening 71*a* of the L-shaped metal plate 71 aligned with the opening 68 in the wall portion 62, and the metal plates 70 and 71 are fixed to the wall portion 62 by a screw 72 which is 4 mm is diameter and is engaged with the openings 70*a*, 68 and 71*a*. Then a hook 34 of a push-pull gauge (9550A of AIKOH ENGINEERING CORP) 30 is engaged with the second opening 71*b* of the L-shaped metal plate 71 and the storage means mounting member 60 is pulled at a speed of 60 mm/min. The value measured by the push-pull gauge 30 (23° C., 50% RH) represents the draw resistance H. The hook 34 is formed of cylindrical material 3 mm in diameter and its shape, size and position are as shown in FIG. 6A.

The ranges of the above formulae (3) and (4) were obtained by first mounting a plurality of storage means mounting members 60 having different values of the draw resistance H on the core tube 40 and evaluating easiness when demounting each storage means mounting member 60 from the core tube 40 by a finger. The relation between the evaluation and the value of the draw resistance H is shown in the following table 2.

TABLE 2

| H(N) | evaluation 1 | evaluation 2 |
|---|---|---|
| 3.0 | X | X |
| 6.0 | Δ | Δ |
| 10.0 | Δ | Δ |
| 12.0 | ○ | ○ |
| 63.0 | ○ | ○ |
| 113.0 | ○ | ○ |
| 150.0 | ▲ | ○ |
| 179.0 | ▲ | ○ |

TABLE 2-continued

| H(N) | evaluation 1 | evaluation 2 |
|---|---|---|
| 234.0 | X | ▲ |
| 250.0 | X | X |

○; does not drop easily during use and can be easily separated after use.
Δ; sometimes slightly shifted during use but does not drop off. Practically no problem.
▲; difficult to separate but can be separated after use.
X; drops during use or cannot be separated after use.

The evaluation 1 in table 2 is an evaluation obtained when the width of the abutment portion 64 of the storage means mounting member 60 is equal to the thickness of the core tube 40, that is, when the edge of the abutment portion 64 of the storage means mounting member 60 does not project outside the outer peripheral surface of the core tube 40.

As can be seen from the above table 2, the draw resistance H is preferably in the range of formula (3) and more preferably in the range of formula (4). Conversely, when the draw resistance H is in the range of formula (3) or formula (4), the storage means 50 can be easily removed from the core tube 40 after use of the stencil material roll 2 and nevertheless cannot drop off the core tube 40 prior to use of the stencil material roll. Further, the storage means mounting member 60 cannot slide relatively to the core tube 40 to be rotated separately from the core tube 40 when the stencil material roll 2 is rotated.

The evaluation 2 in table 2 is an evaluation obtained when the width of the abutment portion 64 of the storage means mounting member 60 is about 10 mm and the edge of the abutment portion 64 of the storage means mounting member 60 projects outside the outer peripheral surface of the core tube 40. When the edge of the abutment portion 64 of the storage means mounting member 60 projects outside the outer peripheral surface of the core tube 40, the fingers can be applied to the projecting edge of the abutment portion 64 of the storage means mounting member 60 when demounting the storage means mounting member 60, the acceptable range of the draw resistance H is widened. In this case, the draw resistance H is preferably in the range of the following formula (5) and more preferably in the range of the following formula (6).

$$3N<H<250N \quad (5)$$

$$10N<H<234N \quad (6)$$

Figure 8:
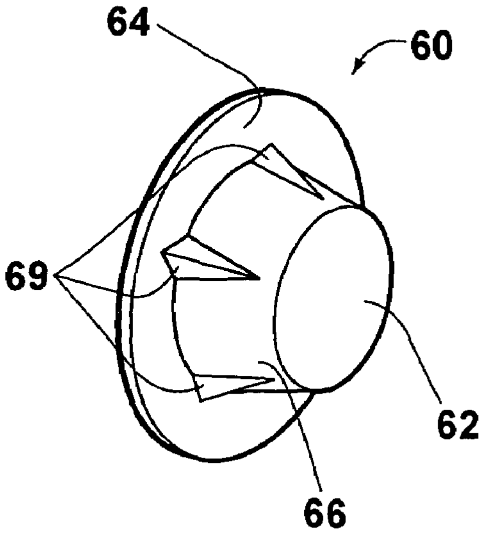
FIG. 8 is a perspective view showing a modification of the storage means mounting member employed in the stencil material roll of the second embodiment.

By forming ribs 69 on the surface of the junction 66 of the storage means mounting member 60 opposed to the inner surface of the core tube 40 as shown in FIG. 8, the draw resistance H of the storage means mounting member 60 can be increased.

In the stencil material roll 2 of the second embodiment, an easy-to-cut portion, for instance, in the form of perforations may be formed in the wall portion 62 as in the first embodiment. In this case, the storage means mounting member 60 may be fixed to the core tube 40, for instance, by bonding.

Figure 9:
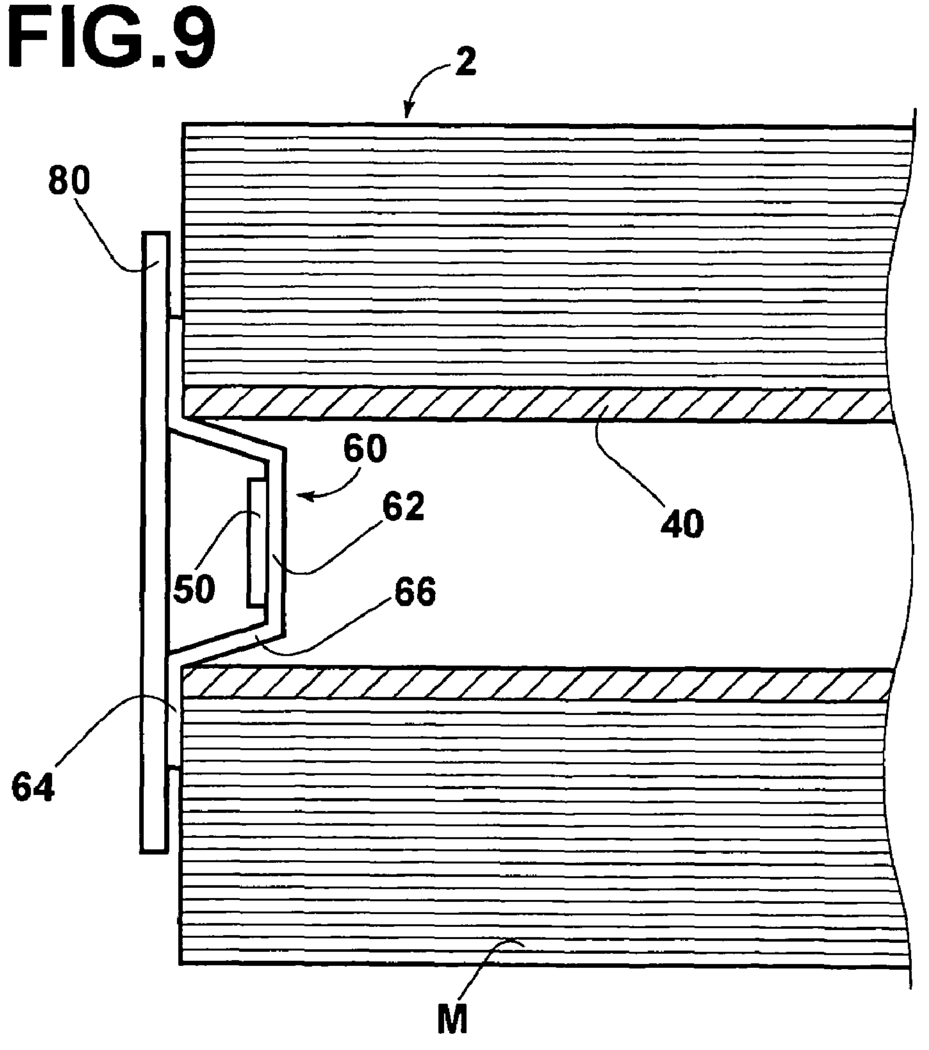
FIG. 9 is a fragmentary cross-sectional view of a stencil material roll in accordance with a third embodiment of the present invention.

The embodiment shown in FIG. 9 is provided with a protective plate 80 which is disposed to abut against the abutment portion 64 of the storage means mounting member 60 and to protect the storage means 50 supported by the storage means mounting member 60. The embodiment shown in FIG. 9 is substantially the same as the second embodiment except the protective plate 80. A similar protective plate may be provided in the stencil material roll 1 of the first embodiment to abut against the end face of the core tube. Such a protective plate may be held in abutment against the abutment portion of the storage means mounting member or the end face of the core tube, for instance, by film for wrapping the stencil material roll or may be bonded to the core tube so that it can be easily separated from the core tube when the stencil material roll is used. By providing such a protective plate, the storage means can be prevented from contacting another member to be broken.

Figure 10:
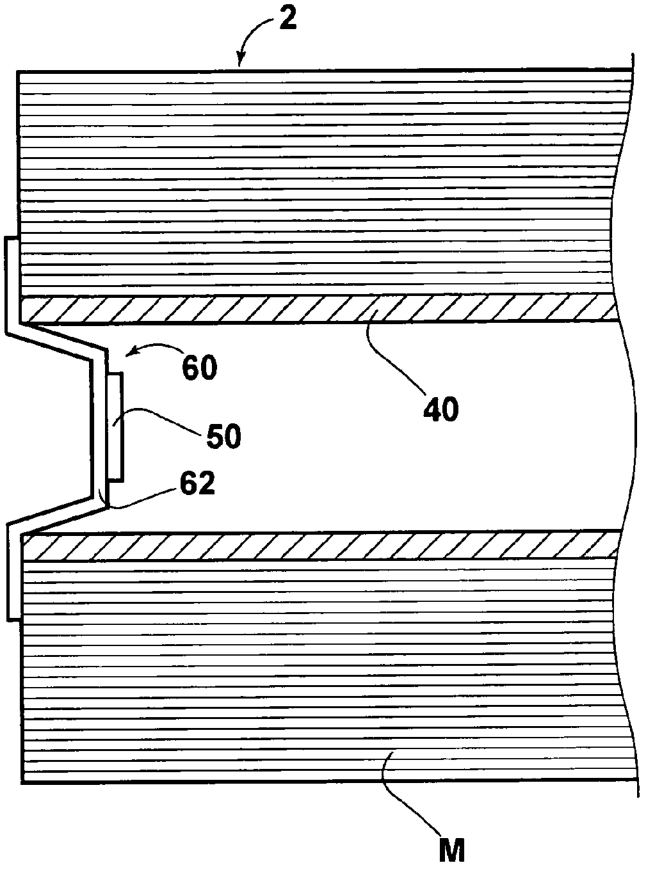
FIG. 10 is a fragmentary cross-sectional view of a stencil material roll in accordance with a fourth embodiment of the present invention.
Figure 11:
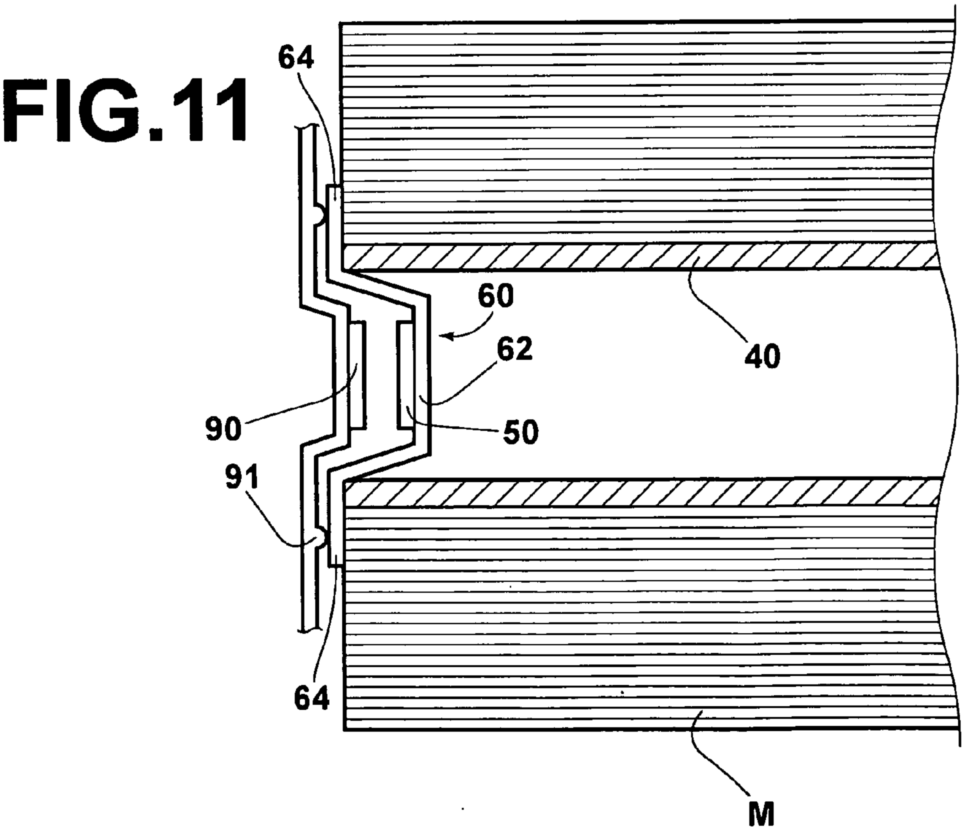
FIG. 11 is a fragmentary cross-sectional view of a stencil material roll in accordance with a fifth embodiment of the present invention.

The embodiment shown in FIG. 10 is substantially the same as the second embodiment except that the storage means 50 is mounted on the inner surface of the wall portion 62. Also in the first embodiment, the storage means 20 may be mounted on the inner surface of the wall portion 12. By disposing the storage means on the inner face of the wall portion, the storage means can be prevented from contacting another member to be broken.

It is preferred that, when the stencil material roll 2 of the second embodiment is loaded in a stencil making section of a stencil printer, the abutment portion 64 of the storage means mounting member 60 abuts against a holder 91 of the stencil making section which holds a readout means 90 for reading out the information from the storage means 50. Similarly, it is preferred that, when the stencil material roll 1 of the first embodiment is loaded in a stencil making section of a stencil printer, the end face of the core tube 10 abuts against a holder 91 of the stencil making section which holds a readout means 90 for reading out the information from the storage means 20. With this arrangement, when the storage means is disposed at a desired distance from the surface to be brought into abutment against the holder 91 and the distance between the readout means and the storage means is reduced, the information can be read out from the storage means constantly at high sensitivity.

What is claimed is:

1. A stencil material roll comprising stencil material in a continuous length rolled around a core tube and a storage means which stores predetermined information, wherein the improvement comprises that the storage means is mounted on a wall portion which forms a part of the core tube or on a wall portion fixed to the core tube, and an easy-to-cut portion is provided on the wall portion to surround the portion where the storage means is mounted.

2. A stencil material roll as defined in claim 1 in which the wall portion on which the storage means is mounted is a wall portion which is provided inside the core tube to extend in a direction substantially perpendicular to the longitudinal axis of the core tube.

3. A stencil material roll as defined in claim 2 further comprising a protective plate for protecting the storage means disposed on the end portion of the core tube on an axially outside of the storage means.

4. A stencil material roll as defined in claim 2 in which the storage means is mounted on an axially inner surface of the wall portion.

5. A stencil material roll as defined in claim 1 in which the easy-to-cut portion is formed by forming perforations through the wall portion to surround the portion where the storage means is mounted.

6. A stencil material roll as defined in claim 1 in which the easy-to-cut portion is formed by forming a thin wall portion to surround the portion where the storage means is mounted.

7. A stencil material roll as defined in claim 1 in which the wall portion on which the storage means is mounted is in the range of larger than 8N and smaller than 185N in cut resistance.

8. A stencil material roll comprising stencil material in a continuous length rolled around a core tube and a storage means which stores predetermined information, wherein the improvement comprises that the storage means is mounted on a wall portion which forms a part of a member fixed to the core tube in abutment against an end face of the core tube, and an easy-to-cut portion is provided on the wall portion to surround the portion where the storage means is mounted.

9. A stencil material roll as defined in claim 8 in which the wall portion on which the storage means is mounted is a wall portion which is provided inside the core tube to extend in a direction substantially perpendicular to the longitudinal axis of the core tube.

10. A stencil material roll as defined in claim 9 further comprising a protective plate for protecting the storage means disposed on the end portion of the core tube on an axially outside of the storage means.

11. A stencil material roll as defined in claim 9 in which the storage means is mounted on an axially inner surface of the wall portion.

12. A stencil material roll as defined in claim 8 in which the easy-to-cut portion is formed by forming perforations through the wall portion to surround the portion where the storage means is mounted.

13. A stencil material roll as defined in claim 8 in which the easy-to-cut portion is formed by forming a thin wall portion to surround the portion where the storage means is mounted.

14. A stencil material roll as defined in claim 8 in which the wall portion on which the storage means is mounted is in the range of larger than 8N and smaller than 185N in cut resistance.

15. A stencil material roll comprising stencil material in a continuous length rolled around a core tube and a storage means which stores predetermined information, wherein the improvement comprises that the storage means is mounted on the core tube by way of a storage means mounting member which is removably mounted on the core tube, and wherein the storage means mounting is provided with an abutment portion abutting against an end face of the core tube.

16. A stencil material roll as defined in claim 15 in which the storage means mounting member is provided with a wall portion which is provided inside the core tube to extend in a direction substantially perpendicular to the longitudinal axis of the core tube.

17. A stencil material roll as defined in claim 16 further comprising a protective plate for protecting the storage means disposed on the end portion of the core tube on an axially outer surface of the wall portion.

18. A stencil material roll as defined in claim 16 in which the storage means is mounted on an axially inner surface of the wall portion.

19. A stencil material roll as defined in claim 15 in which a rib which is brought into contact with the inner surface of the core tube under pressure is formed on a surface of a junction joining the abutment portion and the wall portion opposed to the inner surface of the core tube.

20. A stencil material roll as defined in claim 15 in which the storage means mounting member is in the range of larger than 3N and smaller than 250N in draw resistance.

* * * * *